US012801993B2

(12) United States Patent
Hanayli et al.

(10) Patent No.: US 12,801,993 B2
(45) Date of Patent: Nov. 17, 2026

(54) SYSTEMS AND METHODS FOR IMPROVING RELIABILITY OF MACHINE LEARNING MODELS

(71) Applicant: Analog Devices International Unlimited Company, Limerick (IE)

(72) Inventors: Suleyman Hanayli, Istanbul (TR); Dennis A. Dempsey, Newport (GB)

(73) Assignee: Analog Devices International Unlimited Company, Limerick (IE)

( * ) Notice: Subject to any disclaimer, the term of this patent is extended or adjusted under 35 U.S.C. 154(b) by 620 days.

(21) Appl. No.: 18/365,797

(22) Filed: Aug. 4, 2023

(65) Prior Publication Data

US 2025/0045628 A1 Feb. 6, 2025

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

| | | | |
|---|---|---|---|
| 11,636,389 B2 | 4/2023 | Elisha et al. | |
| 2021/0174258 A1 | 6/2021 | Wenchel et al. | |
| 2022/0183608 A1 | 6/2022 | Zhu et al. | |
| 2024/0212811 A1* | 6/2024 | Vogler | G06N 3/084 |

OTHER PUBLICATIONS

Ahn, J., et al., "On-Device Filter Design for Self-Identifying Inaccurate Heart Rate Readings on Wrist-Worn PPG Sensors", Sep. 2020, IEEE Access, vol. 8, XP011815343, 11 pages.
Extended European Search Report issued Dec. 19, 2024 for European Patent Application No. 24192102.2.

* cited by examiner

*Primary Examiner* — Brandon Hoffman
(74) *Attorney, Agent, or Firm* — ArentFox Schiff LLP

(57) ABSTRACT

Example implementations include a method, apparatus and computer-readable medium for indicating reliability of an artificial intelligence (AI) model, comprising configuring an AI model to generate an output vector representing output values for a first period of time based on an input vector. The implementations further include receiving a plurality of output vectors from the AI model. The implementations further include generating a matrix comprising the plurality of output vectors ordered sequentially such that each output vector of the plurality of output vectors is placed in a unique row or column of the matrix. The implementations further include extracting and filtering values in a cross section of the matrix. The implementations further include calculating a variance of the filtered values. The implementations further include transmitting an indication that the plurality of output vectors is unreliable in response to determining that the variance is greater than a variance threshold.

20 Claims, 6 Drawing Sheets

SYSTEMS AND METHODS FOR IMPROVING RELIABILITY OF MACHINE LEARNING MODELS

BACKGROUND

Technical Field

The described aspects relate to machine learning systems.

INTRODUCTION

Machine learning models (e.g., regression, classification, etc.) and deep learning models (e.g., convolutional neural networks, adversarial neural networks, etc.) have an extensive capacity to learn and demonstrate complicated non-linear relationships and correlations. However, such models face challenges such as low prediction performance for low quality (e.g., uncertain/confusing) input signals and a lack of a reliable indication for accuracy probability.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for indicating reliability of an artificial intelligence (AI) model, comprising configuring an AI model to generate an output vector representing output values for a first period of time based on an input vector, wherein the AI model is initially configured to generate one output value for a point in time based on the input vector. The method further includes receiving a plurality of output vectors from the AI model. Additionally, the method further includes generating a matrix comprising the plurality of output vectors ordered sequentially such that each output vector of the plurality of output vectors is placed in a unique row or column of the matrix. Additionally, the method further includes extracting values in a cross section of the matrix. Additionally, the method further includes applying a filter to the values extracted in the cross section and calculating a variance of the values filtered. Additionally, the method further includes transmitting an indication that the plurality of output vectors is unreliable in response to determining that the variance is greater than a variance threshold.

Another example aspect includes an apparatus for indicating reliability of an artificial intelligence (AI) model, comprising one or more memory and at least one processor coupled with the memory. The at least one processor is configured to configure an AI model to generate an output vector representing output values for a first period of time based on an input vector, wherein the AI model is initially configured to generate one output value for a point in time based on the input vector. The at least one processor is further configured to receive a plurality of output vectors from the AI model. Additionally, the at least one processor further configured to generate a matrix comprising the plurality of output vectors ordered sequentially such that each output vector of the plurality of output vectors is placed in a unique row or column of the matrix. Additionally, the at least one processor further configured to extract values in a cross section of the matrix. Additionally, the at least one processor further configured to apply a filter to the values extracted in the cross section and calculate a variance of the values filtered. Additionally, the at least one processor further configured to transmit an indication that the plurality of output vectors are unreliable in response to determining that the variance is greater than a variance threshold.

Another example aspect includes a computer-readable medium having instructions stored thereon for indicating reliability of an artificial intelligence (AI) model, wherein the instructions are executable by at least one processor to configure an AI model to generate an output vector representing output values for a first period of time based on an input vector, wherein the AI model is initially configured to generate one output value for a point in time based on the input vector. The instructions are further executable to receive a plurality of output vectors from the AI model. Additionally, the instructions are further executable to generate a matrix comprising the plurality of output vectors ordered sequentially such that each output vector of the plurality of output vectors is placed in a unique row or column of the matrix. Additionally, the instructions are further executable to extract values in a cross section of the matrix. Additionally, the instructions are further executable to apply a filter to the values extracted in the cross section and calculate a variance of the values filtered. Additionally, the instructions are further executable to transmit an indication that the plurality of output vectors are unreliable in response to determining that the variance is greater than a variance threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The systems and methods of the present disclosure measure how reliable a deep/machine learning model (hereinafter referred to as an artificial intelligence (AI) model) performs in run time. It is important to know the confidence level and reliability of an AI model. If an output produced by an AI model is not reliable, the output should not be reported to the end user without an appropriate warning or reported with some post processing. This will improve the overall performance and the report management capabilities of any product featuring the AI model, especially in low signal quality regions or cases.

In high-level terms, the systems and methods renovate an AI model and measure the reliability of each target signal output with renovation dynamics. In particular, outputs that are unreliable are detected and flagged. The renovation technique is independent from raw signal type, target output, model type/architecture, or any other model specific factors. It is applicable to any AI model and can easily be implemented with little memory and computation resources.

Figure 1:
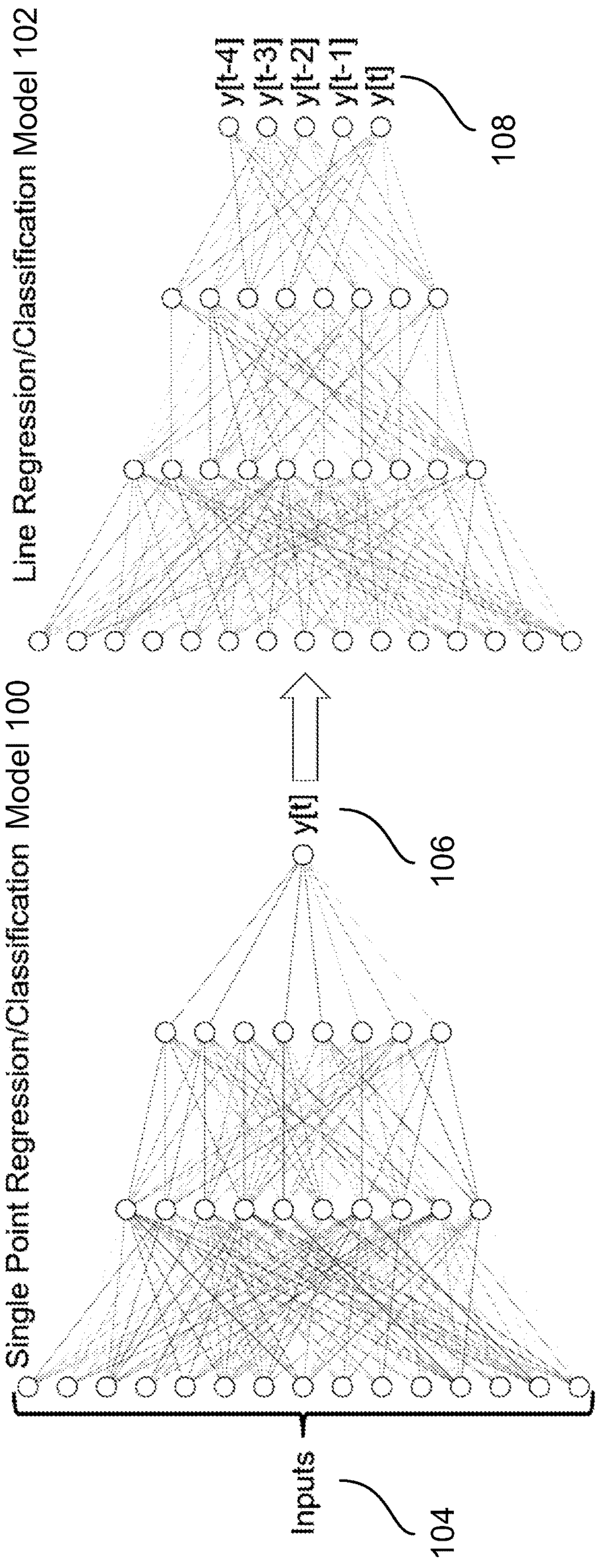
FIG. 1 is an example of a single point regression/classification model being converted to a line regression/classification model.

FIG. 1 is an example of a single point regression/classification model 100 being converted to a line regression/classification model 102. In some aspects, models 100 and 102 are AI models that are either machine learning models or deep learning models. For example, model 100 may be any type of machine learning model such as a 64/32/16-bit float model or quantized artificial/convolutional neural network. Model 100 is configured to generate one output value 106 (e.g., y[t]) for a point in time (i.e., t) based on the input vector 104. Consider an example in which model 100, which is a regression model, is configured to output a heart rate (e.g., 60 beats per minute) at a given time based on an input vector that includes data collected from various sensors. For example, one sensor may be a pulse sensor that uses LED light to detect expansions of blood vessels underneath a skin's surface. The sensor may include an emitter that outputs light at a certain amplitude and a receiver that receives reflected light that has passed through the skin. The input vector 104 may be a waveform that represents the magnitude of the reflected light over a period of time.

A model reliability component (described in FIG. 3) may be a software application that configures model 100 to generate an output vector 108 (e.g., {y[t], y[t−1], y[t−2], y[t−3], and y[t−4]} representing output values for a first period of time based on an input vector. For example, the model reliability component may restructure the layers of model 100 (if it is a neural network) to output multiple heart rates or may restructure the regression formula of model 100 (if it is a machine learning model) to output multiple heart rates. In some aspects, this restructuring happens at the code level and ultimately converts model 100 to model 102.

In some aspects, the configuration of model 100 involves adding historical information to input features extracted by model 100 and retraining model 100 to output the output vector based on the historical information. For example, instead of adding one input vector representing light signals in a time window until time t (e.g., input vector [t]), model 100 may be configured to accept multiple input vectors (e.g., input vector [t−1], input vector [t−2], . . . input vector [t-N]). Model 102 may be configured to output a single output value for each input vector and may merge each output value into one output vector 108 (e.g., y[t] outputted for input vector [t]), y[t−1] outputted for input vector [t−1], etc.).

In an exemplary aspect, each output vector spans a first period of time. For example, each output vector may represent a 5 second window from time t−4] to time t, and each output value is associated with a particular second of the 5 second window.

Subsequent to configuring model 100 to model 102, the model reliability component receives a plurality of output vectors from model 102. In some aspects, the plurality of output vectors span a second period of time that is greater than the first period of time. For example, the first period of time may be a five second window and the second period of time may be a ten second window. The model reliability component then generates a matrix including the plurality of output vectors ordered sequentially such that each output vector of the plurality of output vectors is placed in a unique row/column of the matrix. The model reliability component extracts values in a cross section across multiple rows of the matrix.

Figure 2A:
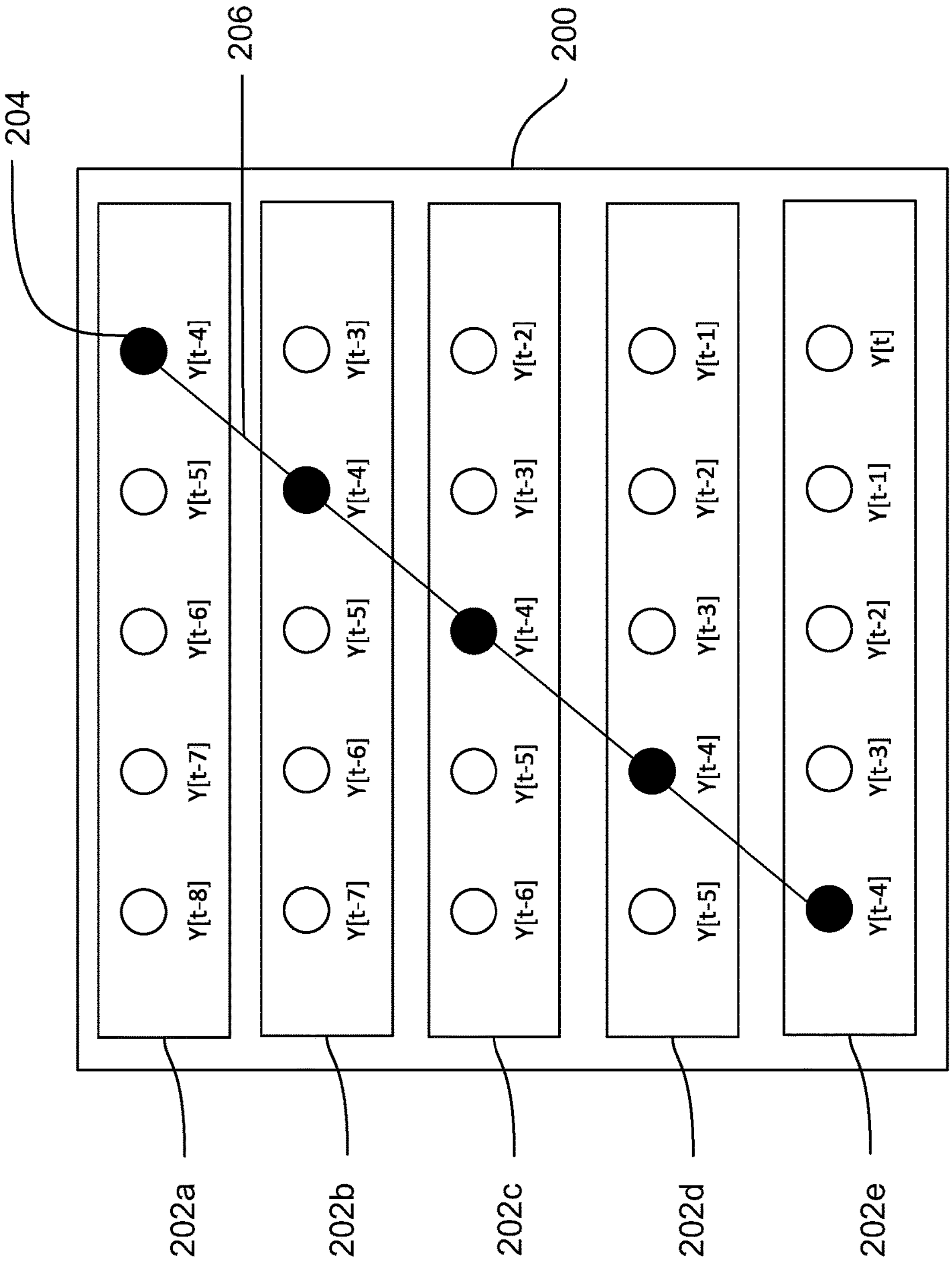
FIG. 2A is an example of a first cross section of matrix that is used to evaluate the reliability of an AI model.

FIG. 2A is an example of a first cross section of matrix that is used to evaluate the reliability of an AI model. Matrix 200 includes output vectors 202*a*, 202*b*, 202*c*, 202*d*, and 202*c*. Each output vector includes an output value 204. In some aspects, the older (further from the current time) output vectors are placed at the top of the matrix 200 while the newer (closer to the current time) output vectors are placed on the bottom. In other aspects, the older output vectors are placed at the bottom and the newer output vectors are placed on the top. In some aspects, matrix 200 is rotated such that each output vector is configured along a column instead of a row. For example, matrix 200 may be rotated by 90, 180, 270, etc., degrees.

Output vector 202*a* is received from model 102 at time t−4 and includes output values between time t−8 and t−4. Output vector 202*b* is received from model 102 at time t−3 and includes output values between time t−7 and t−3. Output vector 202*c* is received from model 102 at time t−2 and includes output values between time t−6 and t−2. Output vector 202*d* is received from model 102 at time t−1 and includes output values between time t−5 and t−1. Output vector 202*a*, which is the latest output vector, is received from model 102 at time t and includes output values between time t−4 and t. As seen in FIG. 2A, the output vectors are ordered in matrix 200 sequentially. This means that output vector 202*c* is succeeded by output vector 202*d*, rather than output vector 202*a*, because output vector 202*d* is received from model 102 after output vector 202*c*. In some aspects, each row of matrix 200 has the same time delta Δt. For example if Δt=1, then t is the current time, with t−1 being one sample period ago, t−2 being two sample periods ago, t−3 being three sample periods ago, etc. In some aspects, each row of matrix 200 has a different time delta Δt. In this case, the samples are not required to be evenly spaced (e.g., compressed sampling may be used). As a result, the first row may be associated with time t, the second row may be associated with time t−2, the third row may be associated with time t−5, etc.

The model reliability component extracts values in a cross section 206 across multiple rows of the matrix 200. In some aspects, the values extracted in the cross section are associated with a same time. For example, cross section 206 is a diagonal line that includes output values from each of the plurality of output vectors; these output values are associated with time t−4. Revisiting the heart rate example, consider the following table that corresponds to the structure of matrix 200:

TABLE 1

| | | | | |
|---|---|---|---|---|
| 88 | 87 | 92 | 91 | 88 |
| 88 | 93 | 93 | 87 | 86 |
| 91 | 92 | 88 | 84 | 85 |
| 92 | 88 | 85 | 83 | 84 |
| 87 | 86 | 84 | 81 | 91 |

The first row corresponds to output vector 202*a* and the final row corresponds to output vector 202*e*. The heart rate values in table 1 are outputs from model 102, which is configured to receive a signal from a sensor (e.g., a pulse sensor outputting a waveform of the reflected light captured) and output the heart rate over a five-second interval. For example, the first row is an output in which model 102 determined that the heart rate is 88 beats per minute (BPM) at time t−8, 87 BPM at time t−7, 92 BPM at time t−6, 91 BPM at time t−5, and 88 BPM at time t−4. The subsequent row is an output from model 102 generated when a new input vector is given. This new input vector may partially overlap with the original input vector for which output vector 202*a* was generated. For example, the original input vector may be a waveform from time t−8 to time t−4. The new input vector may be a waveform from time t−7 and time t−3. For this new input vector, model 102 outputs output vector 202*b*, which indicates that the heart rate is 88 BPM at time t−7, 93 BPM at time t−6, 93 BPM at time t−5, 87 BPM at time t−4, and 86 BPM at time t−3. It should be noted that due to the overlap in time intervals, model 102 is given another opportunity to evaluate a waveform and estimate the heart rate. Suppose that the pulse sensor providing the input vector is implemented in a smartwatch that uses model 100 to output heart rates. While a user may simply see the latest heart rate at time t−4 for output vector 202*a* and at time t−3 for output vector 202*b* on his/her watch, the additional output values are useful in evaluating whether the heart rates are even reliable.

For example, model 102 may receive a low quality signal (e.g., incorrect waveforms because the user is moving the smartwatch or debris has blocked the pulse sensor) and, as a result, may generate heart rates that are inaccurate. One sign of inaccurate heart rates is inconsistencies in readings. For example, in output vector 202*a*, model 102 outputs the heart rate as 88 BPM at time t−4, while in output vector 202*b*, model 102 outputs the heart rate as 87 BPM at time t−4. At any given time, the output values should be the same or quite close. If they are very different and there is no consistency in readings from model 102, then the output vectors include unreliable data.

In order to identify unreliable outputs, the model reliability component identifies a cross section (e.g., cross section 206) in matrix 200. Assuming that matrix 200 is structured as shown in FIG. 2A (i.e., sequentially with an equal time difference between each output vector and an overlap in time intervals), the cross section will be diagonal. This is because the diagonal line cross along the same time (e.g., time t−4 as shown in FIG. 2A). A horizontal line is not an ideal cross section when matrix 200 is structured as shown, because the output values can change within a given period of time. For example, it may be reasonable for a heart rate to fluctuate from time t−8 to time t−4 because the user may become active e.g. by running (thus increasing the heart rate) and then rest (this decreasing the heart rate). However, this fluctuation should be seen consistently across all output vectors (e.g., output vector 202*b* from time t−7 to time t−3) because there is a time overlap between each vector.

The model reliability component then calculates a variance of the values extracted in the cross section. In some aspects, the variance is any one or any combination of: mean, mode, median, standard deviation, kurtosis, skewness, non-statistical metrics, etc. Due to limited sample sizes described in the present disclosure, the calculation of variance may involve t-statistics, which represent the ratio of the departure of the estimated value of a parameter from its hypothesized value to its standard error. Referring to table 1 and FIG. 2A, the extracted values are [87, 88, 88, 87, 88]. Suppose that the variance is given by standard deviation. The model reliability component may determine that the standard deviation is approximately 0.489.

The model reliability component may further determine whether the variance is greater than a variance threshold (e.g., 1). In response to determining that the variance is not greater than the variance threshold (as shown in relation to table 1), the model reliability component may not output any alert and may allow for additional outputs to be received from model 102. In some aspects, the model reliability component may transmit an indication that the plurality of output vectors are reliable.

Alternatively, consider the following example in table 2:

TABLE 2

| | | | | |
|---|---|---|---|---|
| 89 | 86 | 98 | 99 | 98 |
| 81 | 92 | 90 | 98 | 73 |
| 90 | 89 | 94 | 88 | 83 |
| 88 | 93 | 73 | 83 | 83 |
| 88 | 70 | 81 | 82 | 90 |

The cross section associated with time t−4 has extracted values of [88, 93, 94, 98, 98]. The standard deviation for this cross section is 3.70. In response to determining that the variance is greater than the variance threshold (e.g., 1), the model reliability component may transmit an indication that the plurality of output vectors is unreliable. For example, the model reliability component may generate an alert that informs that user (e.g., on his/her smartwatch) that the heart rate values between the current time t and time t−8 are unreliable. In some aspects, the model reliability component may further indicate in the alert that the unreliability may be due to a low quality signal. Depending on the application the model reliability component is used in, the model reliability component may recommend corrective measures to improve the signal. For example, in the case of a portable healthcare device e.g. smartwatch evaluating heart rate, the model reliability component may recommend actions such as tightening the watch around the wrist, cleaning the surface of the pulse sensor, or restarting the smartwatch.

Alternatively, In some aspects, when calculating the variance, the model reliability component may apply a filter to the output values extracted in the cross section. Applying the filter may involve performing at least one of: normalizing, applying a gain factor, scaling non-linearly, or applying an attenuation factor. An advantage of applying a filter is broadening the applicability of the variance threshold to different types of output values. For example, a normal resting heart rate may range from 60 BPM to 100 BPM. However, if model 100 is configured to output a different parameter such as voltages that range from 1 volt to 5 volts, a variance threshold of 0.400 may not be effective in detecting reliability. Accordingly, to level output values, the model reliability component may perform normalization (e.g., dividing all heart rates by a maximum heart rate), apply a gain factor (e.g., multiply all output values by 2), or apply an attenuation factor (e.g., multiply all output values by 0.1). Gain/bias may be applied in digital or software or both, or may be applied in hardware (e.g., programmable gain amplified front end for an analog-to-digital converter). Gain/bias may also be solved by a combination of both hardware and software or digital means e.g. where it may be desirable to perform coarse and fine operations separately.

In some aspects, the model reliability component may perform a combination of these filters (e.g., multiplying all values by an attenuation factor, and normalizing by a mean value of the outputs). Table 3 shows an example of normalized values, where all output values are divided by the highest BPM detected in the second period of time (e.g., 93 BPM):

TABLE 3

| | | | | |
|---|---|---|---|---|
| 0.94 | 0.93 | 0.98 | 0.97 | 0.94 |
| 0.94 | 1 | 1 | 0.93 | 0.92 |
| 0.97 | 0.98 | 0.94 | 0.90 | 0.91 |
| 0.98 | 0.94 | 0.91 | 0.89 | 0.90 |
| 0.93 | 0.92 | 0.90 | 0.87 | 0.97 |

In this case, the cross section includes the output values [0.93, 0.94, 0.94, 0.93, and 0.94]. The standard deviation is 0.00489 and if the variance threshold is 0.005, the output vectors are considered reliable by the model reliability component.

Figure 2B:
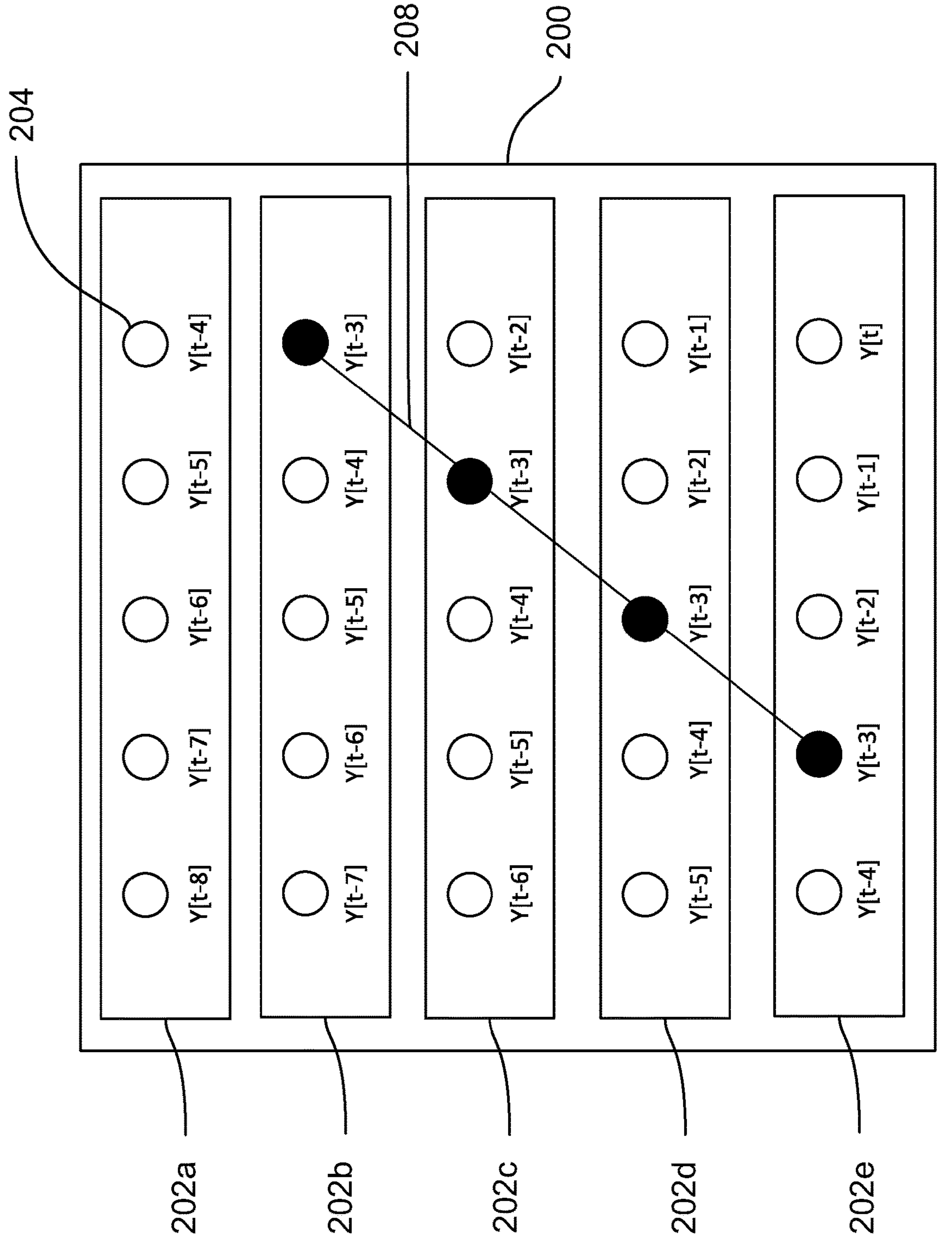
FIG. 2B is an example of a second cross section of matrix that is used to evaluate the reliability of an AI model.

FIG. 2B is an example of a second cross section 208 of matrix 200 that is used to evaluate the reliability of model 102. The model reliability component may select the cross section based on the line with the most output values. For example, in matrix 200, there is one output value 204 for time t−8, two values for time t−7, three values for time t−6, four values for time t−5, five values for time t−4, four values for time t−3, three values for time t−2, two values for time t−1, and one value for time t. Because the most values are associated with time t−4, the cross section extracted may be the line comprising output values of time t−4. In some aspects, the model reliability component may select any cross section at random as long as it has a minimum amount of points (e.g., 3). Referring to matrix 200, this means that the model reliability component may select any line associated with times t−6, t−5, t−4, t−3, and t−2.

In FIG. 2B, for example, the model reliability component may select cross section 208, which includes four output values associated with time t−3. Referring to table 1, cross section 208 includes points [86, 85, 84, 86]. The variance may again be a standard deviation, which is equal to 0.829. If this variance is greater than a variance threshold (e.g., 0.4), the model reliability component may determine that the output vectors of matrix 200 are unreliable.

In some aspects, the model reliability component may select a plurality of cross sections in the matrix. For example, the model reliability component may select each cross section with at least four output values. Referring to matrix 200, this includes a cross section with output values at time t−5, cross section 206, and cross section 208. In some aspects, the model reliability component may determine a variance that is a function of all output values in the selected cross sections. For example, the model reliability component may determine the standard deviation for each cross section, and then determine the average standard deviation based on the three standard deviation values. This average standard deviation is considered the variance of matrix 200 and is compared to the variance threshold.

In some aspects, the model reliability component may continuously update matrix 200 to include new output vectors received from model 102, and may monitor for unreliability. For example, at time t+1, model 102 may output a vector that includes output values spanning from time t−3 to time t+1. In some aspects, the model reliability component may remove the oldest output vector from matrix 200 whenever a new output vector is received. In response to receiving the new output vector, the model reliability component may select a new cross section(s) and perform a new variance calculation.

The examples previously given are for regression-based models. However, the systems and methods are applicable to classification-based models as well as value-output models. For example, an AI model such as model 100 may be configured to output a specific class for a point in time. Considering the example of heart rate, the classes may be "active" or "rest." The model reliability component may interpret classes using numbers (e.g., "1" for "active" and "0" for "rest"). Accordingly, a matrix representation may be structured as shown in the example of table 4.

TABLE 4

| | | | | |
|---|---|---|---|---|
| 0 | 0 | 0 | 1 | 1 |
| 0 | 0 | 1 | 1 | 1 |
| 0 | 1 | 1 | 1 | 1 |
| 1 | 1 | 1 | 1 | 0 |
| 0 | 1 | 1 | 0 | 0 |

Cross section 206 that includes values from table 4 would be [0, 1, 1, 1, 1]. Ideally, the cross section should have the same class for all output values. However, in this case, there is one output value that differs from the others. Again, the model reliability component may calculate a variance (e.g., standard deviation) and compare it against a variance threshold to determine whether the output vectors are reliable.

It should be noted that the consistency of the output values is correlated with the confidence level of the AI model. If the AI model is not confident about an output value, the associated confidence score of the output value may be lower than a threshold confidence score. In some aspects, the confidence scores may be placed in the matrix instead of the output values to determine whether the AI model is consistently confident when outputting multiple values. In some aspects, confidence scores may be appended or prepended to the data in the tables above (e.g., a confidence score for each output vector).

The systems and methods of the present disclosure may be used in many applications for the analysis of temporal variation of a signal including in healthcare, environmental monitoring, industrial applications, the automotive industry, robotics (e.g., drones), and smart cities.

Healthcare may include personal health, animal, and/or machine health. Personal and animal healthcare monitoring may include cardiac monitoring such as heart rate, inter-beat-interval, etc. There are also other monitors which may be used including blood pressure, pulse oximetry (SPO2), movement, and temperature tracking.

In this context, machines include motors, engines, and other mechanical devices such as fans, which are used in homes, and industrial applications (e.g., air conditioning, automotive, smart vehicles, and e-mobility) or agricultural applications. Condition based monitoring is a term commonly used for industrial applications, and may be seen as a form to healthcare focused on machines, motors, engines, etc. Such devices pervade many applications now and hence this solution has a very broad scope of applications.

Figure 3:
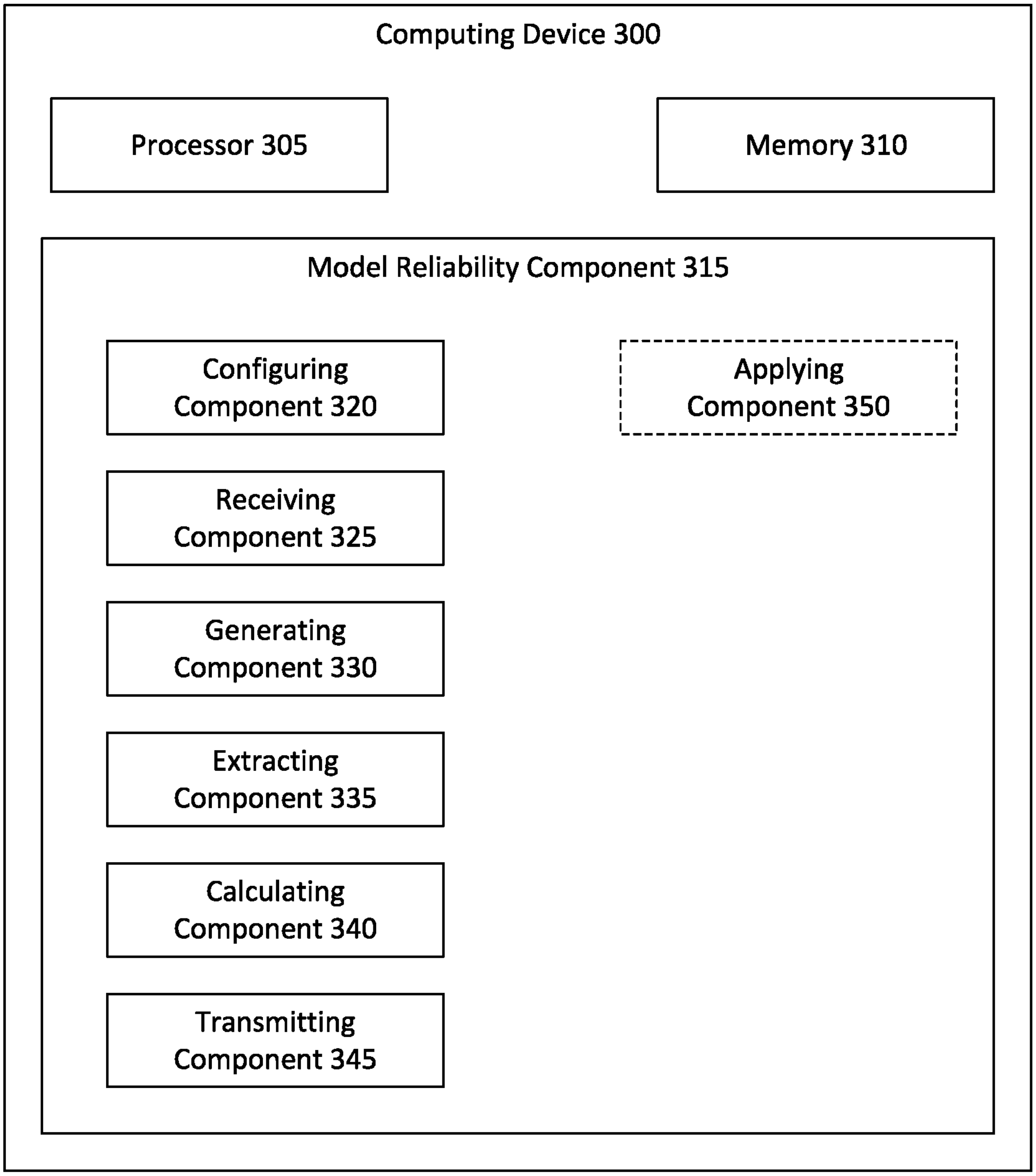
FIG. 3 is a block diagram of an example of a computer device having components configured to perform a method for indicating reliability of an artificial intelligence (AI) model.
Figure 4:
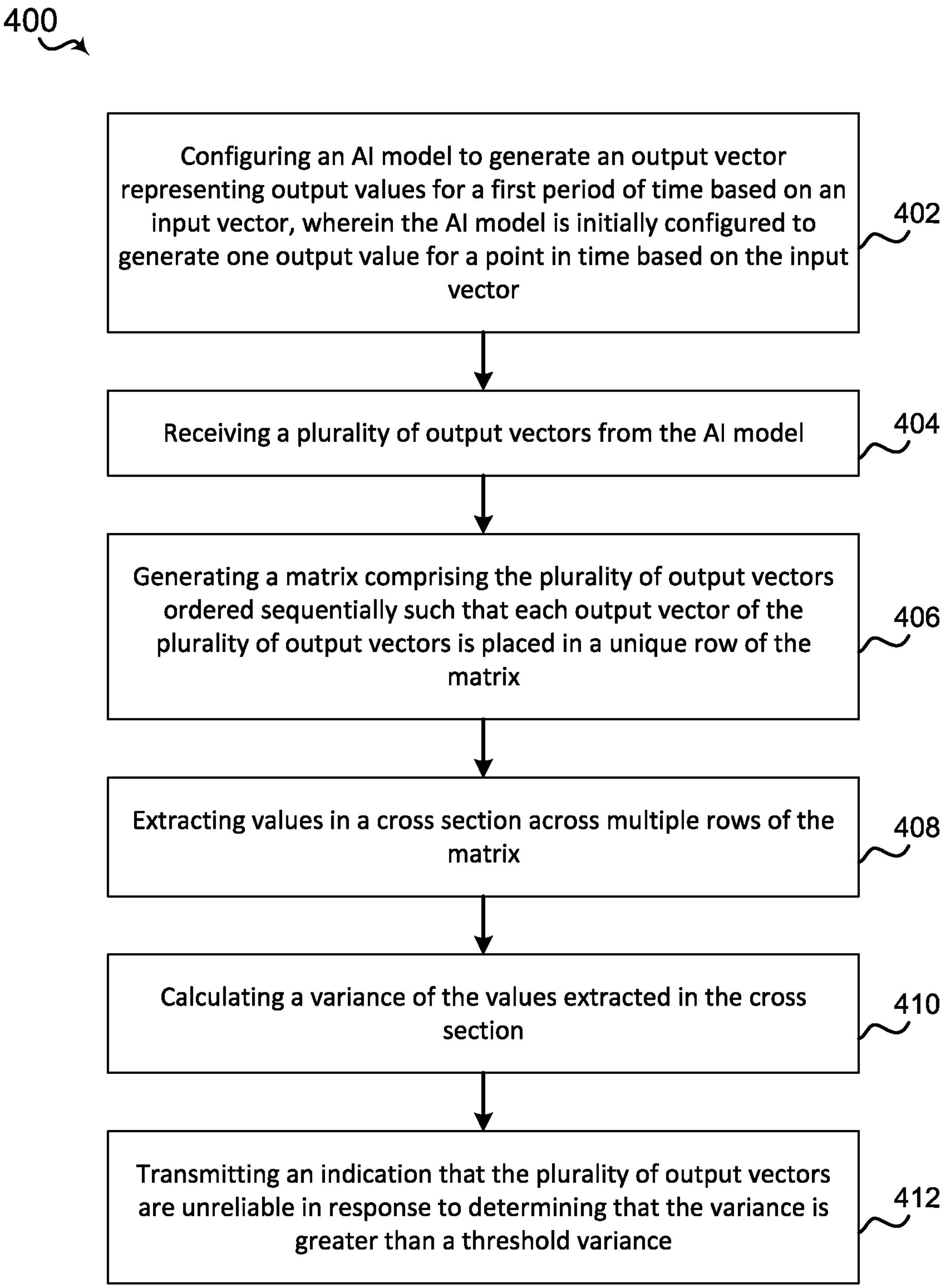
FIG. 4 is a flowchart of an example of a method for indicating reliability of an artificial intelligence (AI) model.

Referring to FIG. 3 and FIG. 4, in operation, computing device 300 may perform a method 400 for indicating reliability of an artificial intelligence (AI) model, such as via execution of model reliability component 315 by processor 305 and/or memory 310. It should be noted that processor 305 may represent one or more processors that work individually or in any combination. Furthermore, memory 310 may represent one or more memory blocks. In fact, the model reliability component 315 may be executed by one or more computing devices 300 as well.

At block 402, the method 400 includes configuring an AI model to generate an output vector representing output values for a first period of time based on an input vector, wherein the AI model is initially configured to generate one output value for a point in time based on the input vector. For example, in an aspect, computing device 300, processor 305, memory 310, model reliability component 315, and/or configuring component 320 may be configured to or may comprise means for configuring an AI model (e.g., model 100) to generate an output vector (e.g., vector 108) representing output values for a first period of time based on an input vector (e.g., vector 104), wherein the AI model is initially configured to generate one output value (e.g., value 106) for a point in time based on the input vector. In an alternative or additional aspect, the AI model is a machine learning model (e.g., a classification model, a regression model, a decision tree, a neural network, etc.).

At block 404, the method 400 includes receiving a plurality of output vectors from the AI model. For example, in an aspect, computing device 300, processor 305, memory 310, model reliability component 315, and/or receiving component 325 may be configured to or may comprise means for receiving a plurality of output vectors (e.g., 202*a*, 202*b*, 202*c*, etc.) from the AI model (e.g., model 102 after model 100 has been configured).

At block 406, the method 400 includes generating a matrix comprising the plurality of output vectors ordered sequentially such that each output vector of the plurality of output vectors is placed in a unique row or column of the matrix. For example, in an aspect, computing device 300, processor 305, memory 310, model reliability component 315, and/or generating component 330 may be configured to or may comprise means for generating a matrix (e.g., matrix 200) comprising the plurality of output vectors ordered sequentially such that each output vector of the plurality of output vectors is placed in a unique row of the matrix.

For example, model reliability component 315 may receive each of the output vectors at a certain time and the matrix may be organized by the time when the output vectors are received.

At block 408, the method 400 includes extracting values in a cross section across multiple rows of the matrix. For example, in an aspect, computing device 300, processor 305, memory 310, model reliability component 315, and/or extracting component 335 may be configured to or may comprise means for extracting values 204 in a cross section (e.g., cross section 206) across multiple rows of the matrix 200.

At block 410, the method 400 includes calculating a variance of the values extracted in the cross section. For example, in an aspect, computing device 300, processor 305, memory 310, model reliability component 315, and/or calculating component 340 may be configured to or may comprise means for calculating a variance of the values extracted in the cross section. In an alternative or additional aspect, the variance is any one or any combination of: mean, mode, median, standard deviation, skewness, tailedness, or kurtosis.

At block 412, the method 400 includes transmitting an indication that the plurality of output vectors is unreliable in response to determining that the variance is greater than a variance threshold. For example, in an aspect, computing device 300, processor 305, memory 310, model reliability component 315, and/or transmitting component 345 may be configured to or may comprise means for transmitting an indication that the plurality of output vectors is unreliable in response to determining that the variance is greater than a variance threshold.

In some aspects, model reliability component may map the variance (e.g., standard deviation, kurtosis, etc.) to a continuous reliability metric such as a confidence level (e.g., 0%, 25%, 50%, 75%, 100%, etc.). For example, the relationship between variance and confidence level may be provided as a function such that a larger variance equates to a lower confidence level. Rather than directly comparing the variance to a variance threshold, the model reliability component may compare the mapped variance to a threshold confidence. When the mapped variance (e.g., 95%) meets or exceeds the threshold confidence (e.g., 90%), the output vectors may be deemed reliable. Otherwise, the output vectors may be deemed unreliable.

In an alternative or additional aspect, the values extracted in the cross section are associated with a same time. For example, cross section 206 includes output values associated with time t−4 taken from different samples.

In an alternative or additional aspect, the cross section is a diagonal line through the matrix. If the matrix is organized sequentially, there is an equal time difference between each output vector, and there is a time overlap for each vector, then all output values associated with the same time will be distributed across a diagonal line. Accordingly, the selected cross section may be a diagonal line.

In an alternative or additional aspect, the plurality of output vectors spans a second period of time, wherein the second period of time is greater than the first period of time. Referring to FIG. 2A, suppose that each output value is separated by a 1 second time difference. For example, the output value of time t−8 is one second apart from the output value of time t−7 in output vector 202*a*. The first period of time represents the time window for a single output vector. For example, the first period of time is a 5 second window for each of the output vectors in matrix 200. The second period of time is the time window of the entire matrix. The oldest point in matrix 200 is the output value of time t−8. The latest point in matrix 200 is the output value of time t. The second period of time thus spans t−8 to t, which is a total of eight sample periods.

Figure 5:
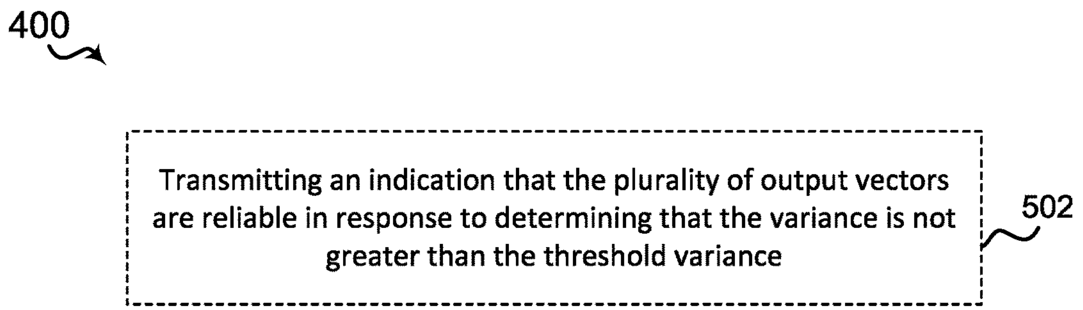
FIG. 5 is a flowchart of additional aspects of the method of FIG. 4.

Referring to FIG. 5, in an alternative or additional aspect, at block 502, the method 400 may further include transmitting an indication that the plurality of output vectors is reliable in response to determining that the variance is not greater than the variance threshold. For example, in an aspect, computing device 300, processor 305, memory 310, model reliability component 315, and/or transmitting component 345 may be configured to or may comprise means for transmitting an indication that the plurality of output vectors is reliable in response to determining that the variance is not greater than the variance threshold.

For example, computing device 300 may be an electronic device with a graphical user interface (GUI) that receives and displays the output values provided by model 100. On this GUI, the model reliability component may output alerts indicating whether the output values are reliable or unreliable. In some aspects, the configuration of the AI model and computations may be performed on a different computing device (e.g., a remote server). For example, model 100 may be uploaded to a server that configures the model to model 102 and provides the configured model to computing device 300. Computing device 300 may then execute model 102 and provide reliability metrics. Thus, there may be a combination of remote and local processing and calculations.

In an alternative or additional aspect, the AI model is a point regression model and configuring the AI model comprises converting the AI model to a line regression model. In an alternative or additional aspect, the AI model is a point classification model and configuring the AI model comprises converting the AI model to a line classification model.

Figure 6:
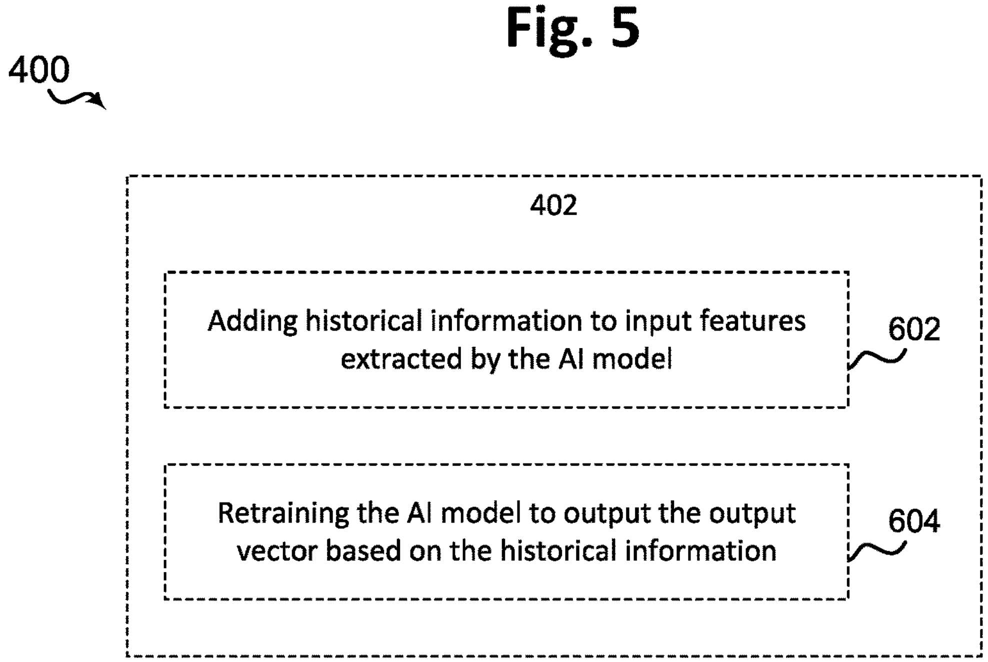
FIG. 6 is a flowchart of additional aspects of the method of FIG. 4.

Referring to FIG. 6, in an alternative or additional aspect, at block 602, the configuring at block 402 of the AI model further includes adding historical information to input features extracted by the AI model. For example, the historical information may be in the form of a longer input vector that includes more input values. Referring to the heart rate example, the input vector may include a waveform that can be used to output the heart rate at time t. In order to get the heart rate for time t−4 to time t, the input vector may be modified to include prior waveforms. The combination of the prior waveforms and the latest waveforms may then be used to evaluate heart rate from time t−4 to time t. The historical information is added to the input features due to the input vector have more information.

In this optional aspect, at block 604, the configuring at block 402 of the AI model further includes retraining the AI model to output the output vector based on the historical information. For example, the retaining may involve providing a labelled dataset that includes input values structured in the modified input vector and actual output values (e.g., the actual heart rates). In some aspects, creating the new training dataset may simply involve restructuring the older dataset to include multiple heart rates in the output values rather than a single output value.

Figure 7:
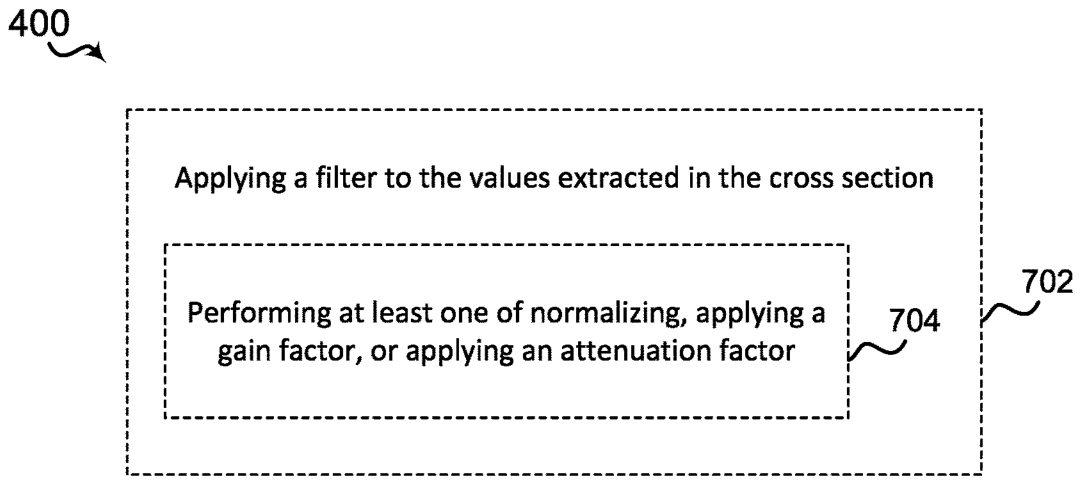
FIG. 7 is a flowchart of additional aspects of the method of FIG. 4.

Referring to FIG. 7, in an alternative or additional aspect, at block 702, the method 400 may further include applying a filter to the values extracted in the cross section. For example, in an aspect, computing device 300, processor 305, memory 310, model reliability component 315, and/or applying component 350 may be configured to or may comprise means for applying a filter to the values extracted in the cross section. In this optional aspect, at block 704, the applying at block 702 of the filter further comprises performing at least one of normalizing, applying a gain factor, scaling non-linearly, or applying an attenuation factor.

The machine learning model may transmit or communicate data using an interface of communication system to share the information with a controller device or function. This communication may be done on an integrated circuit or the communication may be off-chip (e.g., between circuits at a system in package (SiP) or module level), at a printed circuit board (PCB) level or to a remote controller or host for network, or cloud, computing. The model may use federated learning.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An apparatus for indicating reliability of an artificial intelligence (AI) model, comprising:

one or more memory; and at least one processor coupled with the one or more memory and configured to:

configure an AI model to generate an output vector representing output values for a first period of time based on an input vector, wherein the AI model is initially configured to generate one output value for a point in time based on the input vector;

receive a plurality of output vectors from the AI model;

generate a matrix comprising the plurality of output vectors ordered sequentially such that each output vector of the plurality of output vectors is placed in a unique row or column of the matrix;

extract values in a cross section of the matrix;

apply a filter to the values extracted in the cross section;

calculate a variance of the values filtered; and transmit an indication that the plurality of output vectors is unreliable in response to determining that the variance is greater than a variance threshold.

2. The apparatus of claim 1, wherein the values extracted in the cross section are associated with a same time.

3. The apparatus of claim 1, wherein the cross section spans across multiple rows of the matrix or spans across multiple columns of the matrix.

4. The apparatus of claim 1, wherein the cross section is a diagonal line.

5. The apparatus of claim 1, wherein the plurality of output vectors spans a second period of time, wherein the second period of time is greater than the first period of time.

6. The apparatus of claim 1, wherein the variance is any one or any combination of: mean, mode, median, standard deviation, skewness, tailedness, or kurtosis.

7. The apparatus of claim 1, wherein the at least one processor is further configured to:

transmit an indication that the plurality of output vectors is reliable in response to determining that the variance is not greater than the variance threshold.

8. The apparatus of claim 1, wherein to configure the AI model the at least one processor is further configured to:

add historical information to input features extracted by the AI model; and retrain the AI model to output the output vector based on the historical information.

9. The apparatus of claim 1, wherein the AI model is a point regression model and to configure the AI model comprises converting the AI model to a line regression model.

10. The apparatus of claim 1, wherein the AI model is a point classification model and to configure the AI model comprises converting the AI model to a line classification model.

11. The apparatus of claim 1, wherein the at least one processor is further configured to map the variance to a continuous reliability metric representing a confidence score.

12. The apparatus of claim 11, wherein the at least one processor is further configured to transmit the indication that the plurality of output vectors is unreliable in response to determining that the variance mapped is not greater than a threshold confidence score.

13. The apparatus of claim 1, wherein to apply the filter the at least one processor is further configured to perform at least one of normalizing, applying a gain factor, scaling non-linearly, or applying an attenuation factor.

14. A method for indicating reliability of an artificial intelligence (AI) model, comprising:

configuring an AI model to generate an output vector representing output values for a first period of time based on an input vector, wherein the AI model is initially configured to generate one output value for a point in time based on the input vector;

receiving a plurality of output vectors from the AI model;

generating a matrix comprising the plurality of output vectors ordered sequentially such that each output vector of the plurality of output vectors is placed in a unique row or column of the matrix;

extracting values in a cross section of the matrix;

applying a filter to the values extracted in the cross section;

calculating a variance of the values filtered; and transmitting an indication that the plurality of output vectors are unreliable in response to determining that the variance is greater than a variance threshold.

15. The method of claim 14, wherein the values extracted in the cross section are associated with a same time.

16. The method of claim 14, wherein the cross section spans across multiple rows of the matrix or spans across multiple columns of the matrix.

17. The method of claim 14, wherein the cross section is a diagonal line through the matrix.

18. The method of claim 14, wherein the plurality of output vectors spans a second period of time, wherein the second period of time is greater than the first period of time.

19. The method of claim 14, wherein the variance is any one or any combination of: mean, mode, median, standard deviation, skewness, tailedness, or kurtosis.

20. A computer-readable medium having instructions stored thereon for indicating reliability of an artificial intelligence (AI) model, wherein the instructions are executable by at least one processor to:

configure an AI model to generate an output vector representing output values for a first period of time based on an input vector, wherein the AI model is initially configured to generate one output value for a point in time based on the input vector;

receive a plurality of output vectors from the AI model;

generate a matrix comprising the plurality of output vectors ordered sequentially such that each output vector of the plurality of output vectors is placed in a unique row or column of the matrix;

extract values in a cross section of the matrix;

apply a filter to the values extracted in the cross section;

calculate a variance of the values filtered; and transmit an indication that the plurality of output vectors is unreliable in response to determining that the variance is greater than a variance threshold.

* * * * *